United States Patent

[11] 3,619,055

| [72] | Inventors | Harold Brent Archer<br>Pittsford, N.Y.;<br>Charles R. Williams, Wheaton, Ill. |
|---|---|---|
| [21] | Appl. No. | 830,689 |
| [22] | Filed | June 5, 1969 |
| [45] | Patented | Nov. 9, 1971 |
| [73] | Assignee | Sargent-Welch Scientific Company<br>Chicago, Ill. |

[54] EXPOSURE CONTROL DEVICE
14 Claims, 4 Drawing Figs.

[52] U.S. Cl. ............................................. 355/69, 355/70
[51] Int. Cl. .................................................. G03b 27/76
[50] Field of Search .................................. 355/67–71

[56] References Cited
UNITED STATES PATENTS

| 2,593,216 | 4/1952 | Sussin | 355/68 X |
| 3,249,000 | 5/1966 | Pack | 355/70 X |
| 3,298,296 | 1/1967 | Mey | 355/70 X |

Primary Examiner—Samuel S. Matthews
Assistant Examiner—Richard A. Wintercorn
Attorney—Greist, Lockwood, Greenawalt & Dewey ABSTRACT: An instrument for the control of exposure in halftone photography is described which instrument automatically compensates for variations in light sources and variations in flare conditions in the camera. A main lamp sensor and integrator means measures the cumulative illumination produced by the main lamp and flash lamp sensor and integrator means measures the cumulative flash illumination, including flare. Exposure of the main and flash lamps is terminated when the proper amount of light for an exposure is reached, based upon preset calibrations for the camera conditions and the type of work to be done.

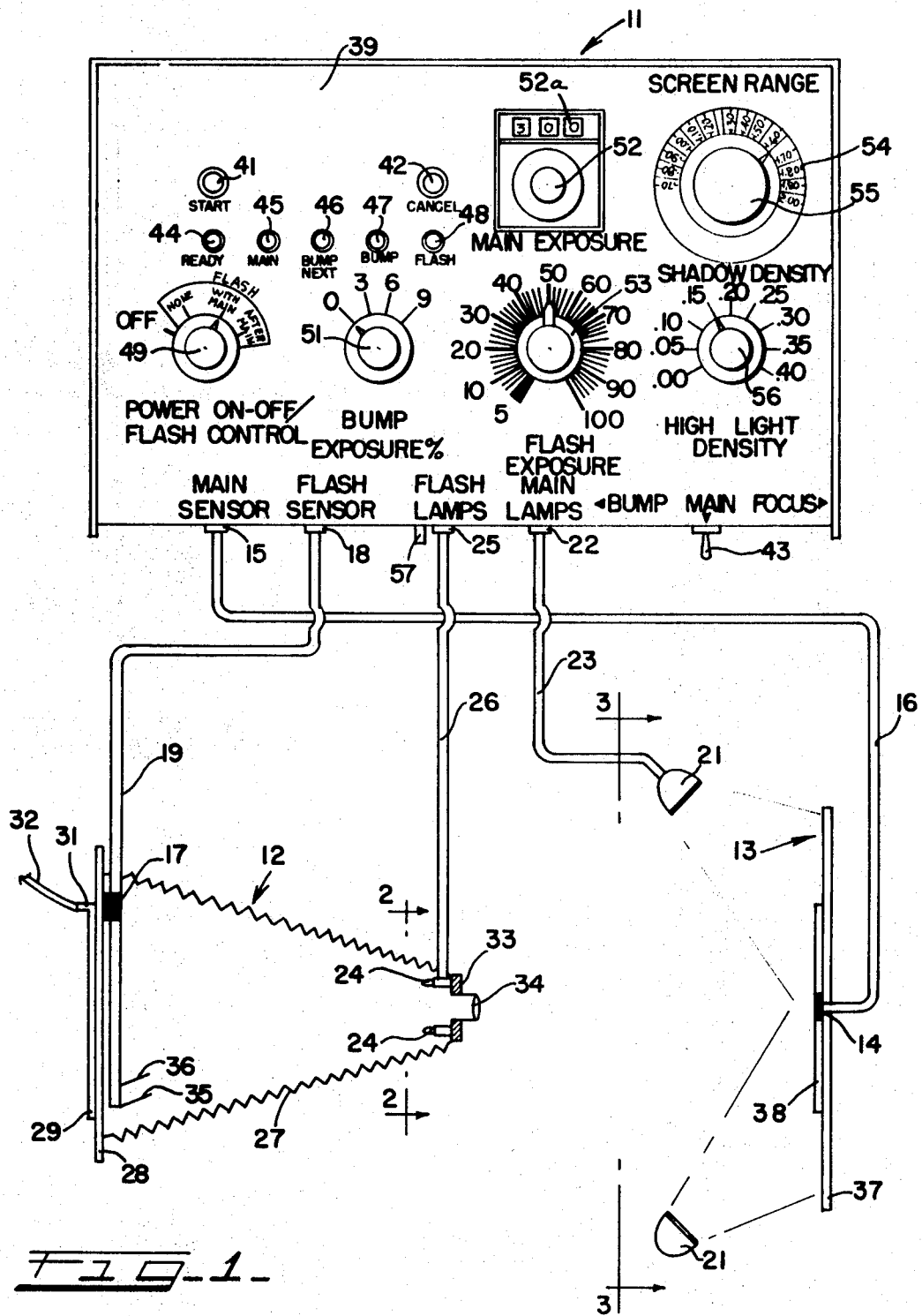

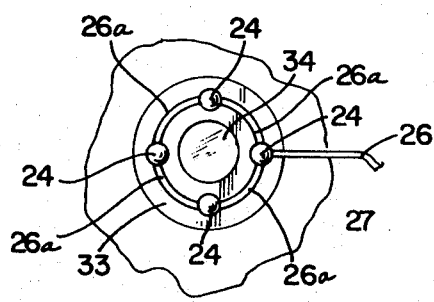
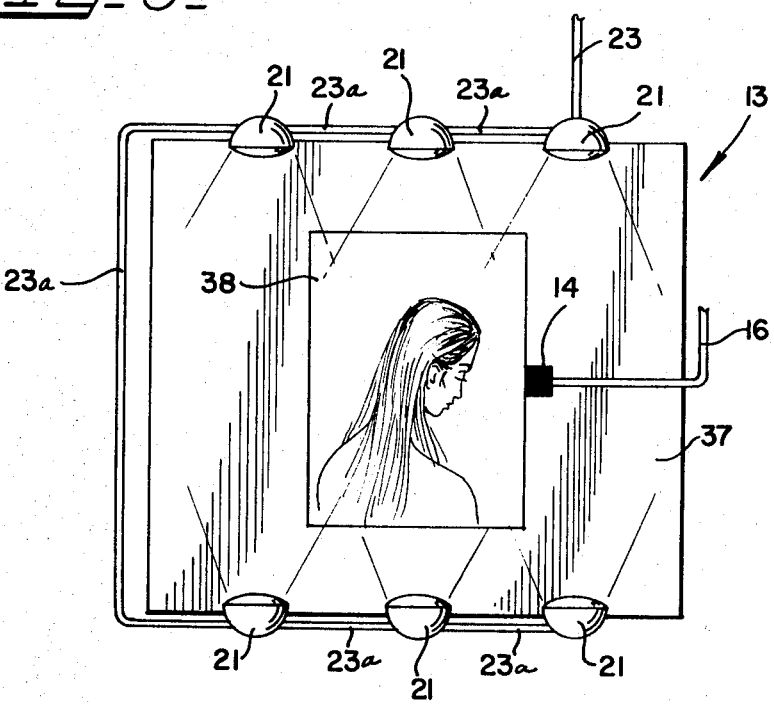

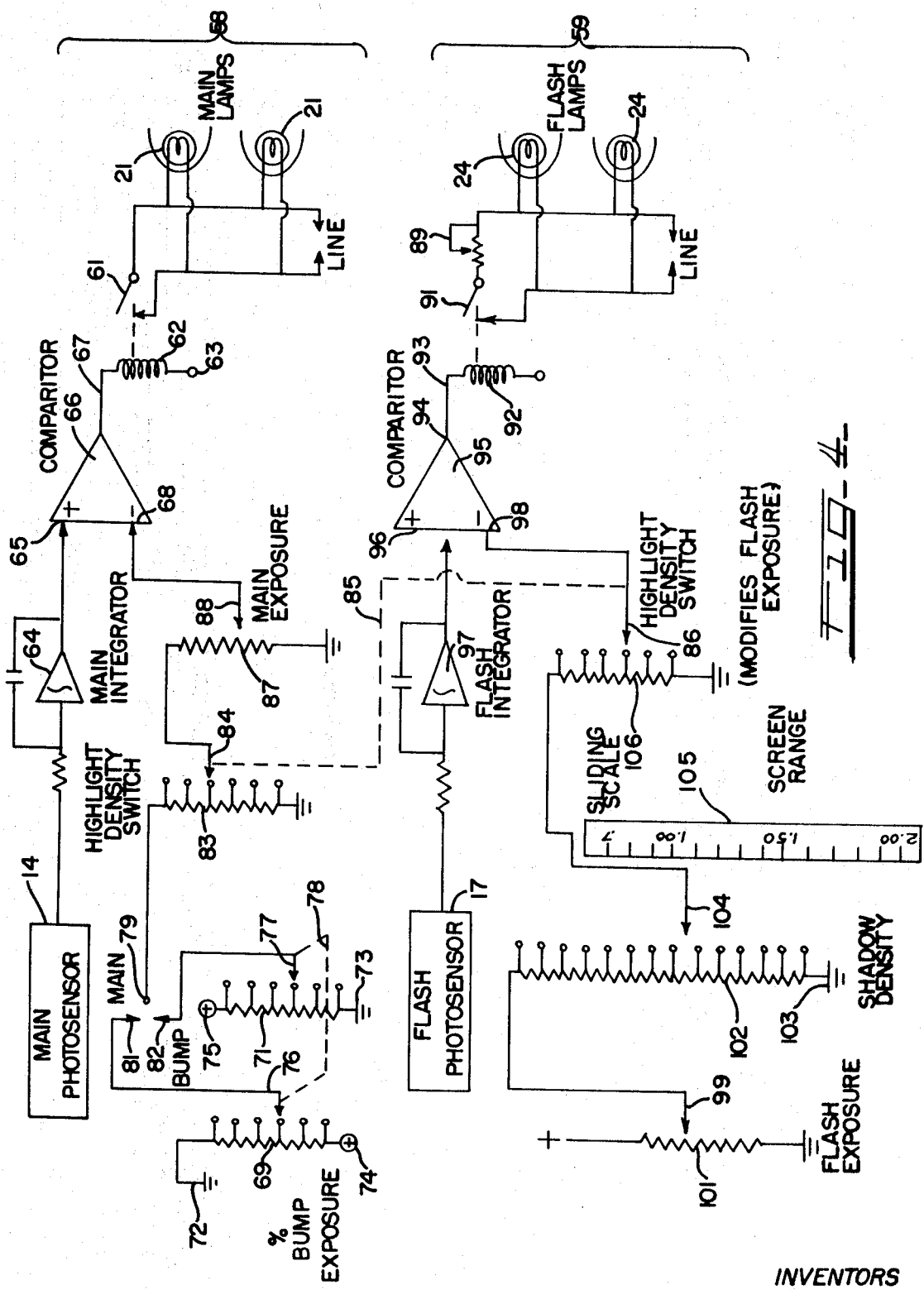

EXPOSURE CONTROL DEVICE

BACKGROUND OF AND DESCRIPTION OF THE INVENTION

As used in the specification and claims, the term "copy density range" signifies the density difference between the highlights (the light tones of a photograph) and the shadows (the darkest areas of a photograph). The term "screen density range" is used to signify the copy density range that a given halftone screen will produce (with halftone dots) with a single white light exposure. The term "basic flash exposure time" is used to denote the flash lamp exposure only. The term "main exposure time at zero highlight density" is used to signify the exposure time with main lamp exposure only and at zero highlight density (or at a predetermined highlight density such as 0.1 which corresponds to the highlight density for magnesium oxide) which corresponds to the single white light exposure used in determining the screen range density. The term "bump exposure time" is used to denote the amount of supplementary no-screen exposure made from the copy.

This invention generally relates to instruments for the control of photographic exposures and, more particularly, is directed to a device for the automatic control of exposure in halftone photography. In this regard, an important embodiment of the present invention is directed to a novel exposure control device which automatically controls main, flash and bump exposure in accordance with copy and camera requirements, such as, for example, screen density range, copy density range, basic flash time, main exposure time at zero highlight density, and the percent bump exposure desired.

Conventionally, printing presses transfer ink from an ink fountain to a printing plate at a constant density. In the reproduction of photographs, however, both intermediate gray and black tones are needed. The change from the continuous tone copy of such photographs to ink-printable images is achieved by halftone photography wherein continuous tone copy is reproduced onto a film as a plurality of dots of various sizes. The sizes of the dots relate to the tones of the original copy with, on a positive film, larger dots appearing in the shadows and smaller dots in the highlights. When the printing press prints halftone dots, the ink transferred from all dots is of the same density with the change in printing values resulting from the differences in dot size.

Halftone negatives and positives are made with a camera from continuous tone copy, for example, black and white photographs, by exposure of such copy on high contrast lithographic film in conjunction with a halftone screen. Three basically different exposures can be used in various combinations to form the proper total exposure upon the film. These exposures are commonly referred to in the art as main exposure, flash exposure, and bump or no-screen exposure. Main exposure is exposure from the copy to the screen and provides the basic image detail on the halftone negative or positive. Typically, main exposure can be from approximately 30 seconds to 2 minutes. Flash exposure is a supplementary exposure given through the contact screen to the lithographic film (without the original or image) and usually is made with a uniform auxiliary light source. Typically, flash exposure can take from approximately 2 to 30 seconds and provides control of copy variations, i.e., flash exposure can be used to extend the screen range to match the copy range. Bump or highlight exposure is a supplementary no-screen exposure made from the copy. Typically, bump exposure will be from 2 percent to 15 percent of the main exposure and acts to shorten the screen range density and thereby increase contrast. Bump exposure is used primarily for process adjustments but can also be used for copy adjustments.

In order to obtain a suitable halftone from a given copy, it is necessary to combine the proper relative amounts of main exposure, flash exposure and bump exposure. In this manner, compensations can be made for variation in the highlight and shadow density of the copy as well as variations in the printing system.

The present invention provides a means for controlling main lamp and flashlamp exposures in halftone photography. In accordance with this invention, the exposure control device is provided with a main lamp sensor and integrator means responsive to illumination generated by a main lamp illumination means and adapted to produce a first signal in response to cumulative illumination produced by the main lamp illumination means. Likewise, such device includes a flashlamp sensor and integrator means responsive to illumination generated by the flashlamp illumination means and adapted to produce another signal in response to the cumulative illumination produced by the flash lamp illumination means as well as any flare. Comparator means is provided for comparing these signals with signals produced in response to predetermined characteristics and conditions of the copy, halftone screen and film, such as, for example, highlight and shadow density of the copy, screen range, basic flash exposure time, main exposure time at zero highlight density and the percent of bump exposure desired. Switch means is operatively connected to said comparator means for controlling the operation of the main lamp and flashlamp illumination means when the proper amount of main exposure, flash exposure and bump exposure is reached.

It is, therefore, an important object of the present invention to provide an improved exposure control device particularly suitable for halftone photography.

Another object of the present invention is to provide an improved exposure control device which automatically compensates for variations in light sources and variations in flare conditions in the camera.

Another object of the present invention is to provide an improved exposure control device which is particularly suitable for use in halftone photography wherein main, flash and bump illumination are automatically controlled in response to predetermined characteristics and conditions of the copy, halftone screen and film, including, the screen density range, the basic flash exposure time, the highlight and shadow densities of the copy, the main exposure time at zero highlight density, and the amount of bump exposure desired.

Another object of the present invention is to provide an improved exposure control device which is particularly suitable for use in halftone photography wherein a main lamp sensor and integrator means responsive to illumination generated by a main lamp illumination means and adapted to produce a signal in response to the cumulative illumination produced by such main lamp illumination means is provided together with a flashlamp sensor and integrator means which is responsive to illumination generated by a flashlamp illumination means and adapted to produce a signal in response to the cumulative illumination produced by the flashlamp illumination means.

Another object of the present invention is to provide an improved exposure control device which is particularly suitable for use in halftone photography and which includes a flashlamp sensor and integrator means which measures the cumulative flash and flare illumination produced in the camera and which automatically adjusts the flash exposure to be provided in accordance with the amount of flare produced.

Another object of the present invention is to provide an improved exposure control device which is particularly suitable for use in halftone photography and which includes a flashlamp sensor and integrator means which, when employed with internal flash means which moves with the camera lens, automatically compensates for adjustments in the distance between such internal flash means and the film.

Another object of the present invention is to provide an improved exposure control device which is particularly suitable for use in halftone photography and which includes a flashlamp sensor and integrator means which, when employed with internal flash means which moves with the camera lens, automatically compensates for adjustments in the distance between such internal flash means and the film.

Another object of the present invention is to provide an improved exposure control device which is particularly suitable for use in halftone photography and which includes means for automatically adjusting main exposure time in accordance with the amount of bump exposure which is desired.

Another object of the present invention is to provide an improved exposure control device which is particularly suitable for use in halftone photography and which includes means for automatically adjusting the cumulative amount of main and bump exposure to be provided in accordance with predetermined conditions in the applicable main exposure time at zero density in the highlight density of the copy.

Another object of the present invention is to provide an improved exposure control device which is particularly suitable for use in halftone photography and which includes means for automatically adjusting the cumulative amount of flash exposure to be provided in accordance with predetermined conditions in the applicable highlight and shadow densities of the copy as well as the screen density.

Other and further objects of the present invention will be apparent from the following detailed description thereof taken in conjunction with the accompanying drawings wherein:

FIG. 1 is a generally schematic view of an exposure control device embodying principles of the present invention and operatively connected to a halftone camera and copyboard;

FIG. 2 is a sectional view of the device shown in FIG. 1 taken along the line 2—2 thereof;

FIG. 3 is a sectional view of the device shown in FIG. 1 taken along the line 3—3 thereof; and FIG. 4 is a schematic view of the electrical circuitry used in the exposure control device of the present invention.

As noted above, the novel exposure control device of the present invention automatically calculates, and provides control over, the correct main exposure and flash exposure times in accordance with predetermined conditions for the camera and the type of work to be done. Typically, these predetermined conditions include the copy density range, the screen density range, the basic flash exposure time, the main flash exposure time at zero highlight density, and the desired amount of bump exposure time. The following brief explanation of the functional relationships of the variables and the calculations performed by the novel exposure control device is set forth in order to provide a better understanding and appreciation of the present invention.

The main exposure time ($T_M$) is a function of the highlight density ($ID_H$) H) of the copy, the percent of bump exposure ($B$) to be used, the main exposure time at zero highlight density ($T_{M0}$), and a screen density constant ($K$). As such, this functional relationship can be expressed as follows:

$$T_M = f(D_H, B, T_{M0}, K)$$

The foregoing functional relationship is such that with an increase in highlight density there is a required logarithmic increase in the main exposure, normally varied by time changes, and with an increase in the percent bump there is a required decrease in the main exposure time for a consistent highlight dot.

The actual or required flash exposure time ($T_F$) may be calculated from the following formula:

$$T_F = T_{BF} - (T_{BF}/10^X)$$

where $T_{BF}$ is the basic flash exposure time and "X" is the difference between the copy density range and the screen density range which can be expressed as follows:

$$X = D_S - D_H - BDR$$

wherein $D_S$ is the shadow density range of the copy, $D_H$ is the highlight density of the copy, and $BDR$ is the screen range density.

The bump exposure time ($T_B$) may be calculated as follows:

$$T_B = (B)(T_M)$$

From the foregoing, it will be apparent that the basic settings (or inputs into the exposure control device of the present invention) for a given halftone photographic operation will be the screen density range ($BDR$), the basic flash exposure time ($T_{BF}$), the percent bump exposure desired ($B$), and the main exposure time at zero highlight density ($T_{M0}$). Likewise, the copy to copy settings will be the highlight density of the copy ($D_H$), the shadow density of the copy ($D_S$) and, if desired, any optional variation in the percent of bump exposure which may be desired for contrast adjustment of the copy. The exposure control device of the present invention will correctly determine and control the proper main exposure time ($T_M$), flash exposure time ($T_F$) and bump exposure time ($T_B$).

Referring to the drawings, and with particular reference to FIGS. 1-3, a control unit embodying the principles of the present invention is generally designated by the reference numeral 11 and operatively connected to a camera 12 which is set up for halftone photography of a copyboard assembly 13.

As best shown in FIG. 1, control unit 11 includes a main photosensor 14 which is remotely located from the control unit and which is connected to a main sensor receptacle 15 through a connecting wire 16. Likewise, flash photosensor 17 is remotely located from the control unit 11 and connected to an appropriate flash photosensor receptacle 18 through a suitable communicating wire 19. A main illumination means in the form of a plurality of lamps 21 is provided and arranged for even illumination of the copyboard assembly 13. Main illumination lamps 21 are connected to a suitable main illumination control line receptacle 22 through a suitable wire 23. As best shown in FIG. 3, each of the lamps 21 is interconnected for single control of said plurality of lamps by interconnecting wires 23a.

A plurality of flashlamps 24 are located in the camera 12 and connected to a flashlamp control line receptacle 25 through a suitable flashlamp control wire 26. As best shown in FIG. 2, each of the bulbs 24 is interconnected by control wires 26a.

Camera 12 includes a bellows portion 27 which is connected at one end to a vacuum backing member 28 having a suction compartment 29 which is equipped with a suitable vacuum connection 31. A tubular hose 32 communicates vacuum line connection 31 with a vacuum or suction source which is not illustrated. A front panel 33 is connected to the opposite end of the bellows 27 and includes a lens 34. Vacuum backing member 28 of camera 27 has mounted thereon a high speed lithographic film plate 35 over which a conventional halftone screen has been applied.

As best shown in FIG. 3, copyboard assembly 13 includes a generally planar board member 37 on which a continuous tone photograph 38 has been placed. As is apparent, a halftone is to be made of the continuous tone photograph or copy 38.

Control unit 11 includes a top panel portion 39 which, as best shown in FIG. 1, includes a plurality of control buttons, dials and lamps. For example, pushbutton starter and cancel switches 41 and 42, respectively, are provided. Starter switch 41 will start the main exposure or the bump exposure depending upon the position of toggle switch 43. As shown in FIG. 1, toggle switch 43 is a three position switch containing the designations "main," "BUMP" and "FOCUS." Toggle switch 43 will normally be in the "MAIN" position, However, it must be manually switched to the "BUMP" position to perform bump exposure or to the "FOCUS" position to turn on copyboard lights and open the camera shutter for purposes of focusing the camera on the copy.

Panel 39 includes a plurality of lamps 44, 45, 46, 47 and 48 which are respectively designated by the legends "READY," "MAIN," "BUMP NEXT," "BUMP" and "FLASH". The "READY" lamp is provided to indicate that the control unit 11 is ready to start exposure. The "MAIN" lamp 45 is provided to indicate that the main exposure is in process, the "BUMP NEXT" lamp 46 is provided to indicate that the control unit 11 is ready to control the bump exposure. Such bump exposure will only be provided when the toggle switch 43 is in the "BUMP" position. The "BUMP" lamp 47 is provided to indicate that the bump exposure is in process. Likewise, the "FLASH" lamp 48 is provided to indicate to the starter that the flash lamps 24 are illuminated.

The rotary switch 49 is provided to select the method of making flash exposure. When this switch is in the "NONE" position there will not be a flash exposure regardless of any other settings in the control unit. When the switch is in the "-WITH MAIN" position, the flashlamps will be turned On at the beginning of the main exposure and stay on until the flash exposure, as determined by the control unit 11, is completed. When switch 49 is in the "AFTER MAIN" position, flashlamps 24 will not come on until after main exposure is completed. This position offers the advantage of enabling the flash control integrator, more fully described below, to start integrating at the beginning of main exposure so that all of the flare developed during main exposure is accounted for in controlling and regulating the flash exposure.

A rotary switch 51 labeled "BUMP EXPOSURE PERCENT" is provided for selecting the desired degree of bump. In accordance with the present invention, as will be more fully described below, increasing the percent bump exposure results in a simultaneous and automatic reduction in the main exposure based upon the amount of bump illumination selected.

"MAIN EXPOSURE" switch 52 permits the setting of the main exposure time at zero highlight density and includes a three digit counter 52a for the purpose of accurately setting this variable. As will be more fully described in connection with FIG. 4, "MAIN EXPOSURE" switch 52 sets the number of light units in the basic exposure which is then modified by the settings of highlight density and bump percent.

"FLASH EXPOSURE" switch 53 is a rotary switch which permits the setting of the number of light units in the basic exposure which is then modified by the settings for highlight density, shadow density and screen range as is more fully described in conjunction with FIG. 4. A movable scale 54 designated "SCREEN RANGE" is provided and enters the value of the screen range density into the control unit 11 and, as will be apparent from the description of FIG. 4, such screen range density affects the actual flash exposure and has no effect on the main exposure.

A rotary switch 55 designated "SHADOW DENSITY" is provided for entering the value of the shadow density of the copy into the control unit 11. As will be more apparent from the description of FIG. 4, the setting for shadow density affects flash exposure only.

A rotary switch 56 labeled "HIGHLIGHT DENSITY" is provided for entering the value of the highlight density of the copy into the control unit 11. As will be more apparent from the description of the circuit diagram in FIG. 4, the setting for highlight density will affect both the main exposure and the flash exposure.

In the illustrated embodiment, an adjustment screw 57 is provided for regulating the brightness of the flash lamps. As is more fully shown in FIG. 4, and as is well known in the art, such adjustment screw communicates with a potentiometer which is connected in series to the flash lamps.

In the preferred embodiment of the present invention, flash photosensor 17 is positioned in the plane of film plate 35. In this manner, flash photosensor 17 is able to read and record all flare produced in the camera, such as, for example, that which is produced when some of the light from the main exposure is reflected from the film onto the camera bellows and from such bellows back onto the film in general as nonimage over all exposure. Since flash photosensor 17 communicates with a flash integrator, more fully described in conjunction with FIG. 4, automatic compensation for flare is made possible in the control of flash exposure by the control unit 11. In other words, flash photosensor 17 will pick up and record in its associated flash integrator all flare produced in the camera and cumulatively record such flare in its associated integrator so that such cumulative amount of flare will be deducted from the amount of flash exposure to be provided by the flash lamps 24. This important advantage of the present invention avoids the problem of excessive flash which has been present in prior art exposure control devices.

As best shown in FIGS. 1 and 2, flashlamps 24 are mounted to the interior portion of the front panel 33 of camera 12. In particular, such flashlamps are mounted in the camera adjacent the lens 34 and outside the light path of main exposure. Typically, as shown, four separate lightbulbs, each of about 7.5 watts, can be used as the flash exposure means, however, equivalent flashlight sources can be used in place thereof. If desired, adjustments can be made to use external flash exposure means. Typically, such external flash exposure means can consist of a lamp placed approximately 5 feet from the film holder and positioned so that when the camera back is swung open the film and screen receive uniform illumination therefrom. By locating flash photosensor 17 adjacent the film plate 35 and in the plane thereof, effective integration of the flash onto the film plate by such external light source is accomplished.

An important advantage obtained with the preferred embodiment of the present invention as illustrated in FIG. 1 wherein flash photosensor 17 is mounted to the camera back and in the plane of film plate 35 and flashlamps 24 are mounted to the forward panel 33 of camera 27, concerns the automatic compensation for variations in the distance between the flash lamps and the film plate 35. In particular, since photosensor 17 is associated with a flash integrator, it functions independently of variations in lamp distance. Accordingly, even though the intensity of illumination provided by flash lamps 24 will vary in accordance with the inverse square law, flash photosensor 17 and its associated flash integrator will record the cumulative amount of illumination received by the film plate 35.

Referring now to FIG. 4, a simplified or condensed schematic illustration of the electrical circuitry of the invention is shown. Basically, since the illumination of the copy is accomplished by the main lamps and the flashlamps, the circuit will be described with reference to a main lamp circuit portion 58, including its associated control circuitry, and a flashlamp portion 59 with its associated circuitry. Since bump exposure, although separately controlled in a manner to be more fully described herein, is accomplished by the main lamps, the bump exposure circuit is associated with the main lamp circuit 58.

In FIG. 4, a pair of main lamps 21 are shown to be connected in parallel circuit relation to each other across a line voltage, for example, a 110 volt alternating current, and to be controlled by a switch 61 which is operated by a contactor coil 62 having one terminal 63 thereof grounded. The switch is held in one position or the other by spring bias, for example, and is moved to the other position thereof by energization of the coil 62. When the main lamps 21 are energized, light therefrom directed toward the copy 38 is detected by main photosensor 14 of a conventional type which is responsive to the intensity of light incident thereon. Since the present invention is concerned with precise exposure control, and is particularly concerned with the cumulative amount of light falling on the photosensor 14, a main integrator assembly 64 is provided in series with the output from the photosensor 14. The signal emanating from the integrator 64 is impressed on a positive polarity terminal 65 of a comparator unit 66 which includes an output line 67 series connected to the coil 62 and which also includes a negative or opposite polarity terminal 68.

Means for controlling the proportion of the main exposure time to the bump exposure time in a predetermined relation is provided in the form of a relative main exposure potentiometer 69 and a relative bump exposure potentiometer 71, each having a ground line 72, 73 and a positive polarity line 74, 75, respectively. These potentiometers are arranged so that the main contact 76 and the bump contact 77 thereof (which are both controlled by panel switch 51) respectively move together but in opposite directions in relation to the positive terminals 74 and 75. Thus, as main contact 76 moves toward a point of higher potential, bump contact 77 moves toward a point of lower potential, and vice versa. The sum of the voltages available is always equal to unity, or, if the absolute voltages are different, movement of the contacts 76 and 77 which are shown ganged at 78 is such that decreasing voltage on one inherently increases voltage on the other. A switch 140 is movable between a main terminal 81 and a bump terminal 82 so that the output of the potentiometers 69 and 71 may be successively applied to a highlight density potentiometer 83, having a switch contact 84 engageable therewith in a plurality of different positions. A ganged connection 85 is schematically shown between this switch contact 84 and an associated highlight density switch contact 86 associated with the flashlamp circuit 59 which will be described in detail further herein (switches 84 and 86 are regulated by panel switch 56). In series with the switch contact 84 is a main exposure potentiometer 87, the movable contact 88 of which is connected to the negative terminal 68 of the comparator 66 (main exposure potentiometer 87 is regulated by panel control 52). Thus, the signals from the relative bump and main exposure potentiometers 60 and 71 may be successively fed to the comparator 66 under the control of the highlight density potentiometer 83 and the main exposure potentiometer 87 in the relative proportions determined by the relative main and bump exposure potentiometers 69 and 71 and there compared with the signal from the cumulative illumination indicating means or main integrator 64. After lapse of a time period determined by the intended exposure time of each cycle, as corrected by the main integrator 64, the coil 62 is actuated to open the main lamp switch 61.

Referring now to the flashlamp portion 59 of the circuit, a pair of flashlamps 24 are connected in parallel across a 110 volt AC line having an adjustment potentiometer 89 in series with the lamps 24 and a switch 91, actuated by a relay contacting coil 92 which, in turn, has a terminal 93 thereof attached to the output terminal 94 of a comparator 95 (potentiometer 89 is controlled by adjustment screw 57). In a manner similar to the main lamp circuitry just described, a positive polarity terminal 96 of the comparator 95 is connected through a flashlamp cumulative illumination means or integrator unit 97 to the output terminal 98 of the flash photosensor 17. Thus, cumulative illumination is measured and supplied to the comparator 97 for comparison to the signal applied to the comparator negative polarity terminal 98. Flash exposure time is determined initially by the position of the contact 99 of the flash exposure potentiometer 101 (which is regulated by panel control switch 53). The flash exposure potentiometer output is supplied to the shadow density potentiometer 192 having a grounded terminal 103 and a movable contact 104 (shadow density potentiometer 102 is controlled by panel switch 55). Position of the contact 104 is desired to be varied in relation to both the shadow density, ad determined by direct measurements of the copy with a densitometer or visual comparison with a gray scale, and in relation to the screen range, which is determined in a known manner according to the screen characteristics, film sensitivity, developer characteristics, and the like. Accordingly, a screen range sliding scale indicator 105 (corresponding to panel scale 54) is provided so that the position of the contact 104 may be properly made. A highlight density potentiometer 106 is connected to the contact 104, and the switch contact 86 is movably associated therewith, across a finite number of positional terminals. As noted above, the switch contacts 84 and 87 are ganged for simultaneous operation.

All of the elements comprising the circuitry shown are conventional in and of themselves, and do not form a necessary part of the invention. However, one form of integrator which has been found useful is a so-called solion (Solution ionization) tetrode, having a common electrode, an input electrode, a shield electrode and a readout electrode. The device is in the form of a hollow tube filled with a solution in which ionization of iodine to the iodine ion may reversibly take place under the influence of an applied current. Various compartments are provided and separated from each other by diffusion barriers. The amount of iodine moved into or out of a particular compartment is related to the quantity of current which has flowed, and therefore, the integral of the input current of the device may be readily determined. Other operational amplifiers of well known types, that is, amplifiers having high DC stability and relatively great immunity from oscillation, such as amplifiers having large negative feedback, may be used.

In operation, the halftone camera is first set up in the usual manner for the reproduction desired. In particular, the proper lithographic film and screen are mounted in the camera and the camera is then focused on the copyboard.

The screen range density, main exposure time at zero highlight density, flash exposure time, percent bump exposure and copy density range are then determined in a conventional manner and these variables are then set into the control unit 11 of the exposure control device. In particular, the thus determined main exposure time at zero highlight density is set into control unit 11 by counter 52 and the thus determined basic flash exposure time, screen range density, shadow density and highlight density are set into the unit 11 by controls 53, 54, 55 and 56, respectively. The desired bump exposure is then set on dial 51 and the main-flash sequence desired is set with control knob 49.

The copy of which a halftone is to be made is then positioned on the copyboard 37. Toggle switch 43 is then placed in the "MAIN" position and "START" button 41 depressed. The "MAIN" and "FLASH" lamps 45 and 48 will be illuminated during main and flash exposure which, in accordance with the present invention, are precisely controlled to provide the proper amount of main and flash light for the camera and copy conditions and characteristics. The "BUMP NEXT" lamp 46 will then be illuminated when main and flash exposures are completed. The halftone screen is then removed and toggle switch 43 is set on the "BUMP" position and "START" button 41 depressed. After the bump exposure, which is also terminated automatically, the film can be removed and processed in a known manner.

While in the foregoing specification a detailed description of a preferred embodiment of the present invention has been set forth for purposes of explanation, many variations may be made by those skilled in the art without departing from the spirit and scope of this invention as set forth in the appended claims.

We claim:

1. An exposure control device for use in controlling main lamp and flashlamp exposures in halftone photography wherein a copy is being photographed by a camera having a halftone screen and film mounted therein, said device comprising: main lamp illumination means; flashlamp illumination means; main lamp sensor and integrator means responsive to illumination generated by said main lamp illumination means and adapted to produce a first signal in response to the cumulative illumination produced by said main lamp illumination means; flashlamp sensor and integrator means responsive to illumination generated by said flashlamp illumination means and adapted to produce a second signal in response to the cumulative illumination produced by said flashlamp illumination means and the total flare produced in said camera; comparator means for comparing said first and second signals with signals produced in response to predetermined characteristics and conditions of said copy, halftone screen and film; and switch means operatively connected to said comparator means for controlling the operation of said main lamp and flashlamp illumination means in response to a predetermined condition of said first and second signals.

2. An exposure control device as defined in claim 1 wherein said flashlamp sensor and integrator means includes a photosensitive sensor which is positioned to record the total illumination generated by said flashlamp illumination means and the total flare produced in said camera.

3. An exposure control device as defined in claim 2 wherein said photosensitive sensor is mounted in said camera in substantially the same plane as said film and said flashlamp illumination means is also mounted in said camera.

4. An exposure control device as defined in claim 1 wherein main exposure is automatically regulated in accordance with the amount of bump exposure desired in order that the cumulative illumination produced by said main lamp illumination means during main exposure and bump exposure will not exceed a predetermined value.

5. An exposure control device for use in controlling main lamp and flashlamp exposures in halftone photography wherein a copy having a predetermined highlight density and shadow density is being photographed by a camera having a halftone screen and film mounted therein which have a predetermined screen range, basic flash exposure time, and main exposure time at zero highlight density, said device comprising: main lamp illumination means; flashlamp illumination means; main lamp sensor and integrator means responsive to illumination generated by said main lamp illumination means and adapted to produce a first signal in response to the cumulative illumination produced by said main lamp illumination means; flashlamp sensor and integrator means responsive to illumination generated by said flashlamp illumination means and adapted to produce a second signal in response to the cumulative illumination produced by said flashlamp illumination means; comparator means for comparing said first and second signals with signals produced in response to the predetermined highlight and shadow density of the copy, screen range, basic flash exposure time, and main exposure time at zero highlight density; and switch means operatively connected to said comparator means for controlling the operation of said main lamp and flashlamp illumination means in response to a predetermined condition of said first and second signals.

6. An exposure control device as defined in claim 5 wherein said flashlamp sensor and integrator means includes a photosensitive sensor which is positioned to record the total illumination generated by said flashlamp illumination means and the total flare produced in said camera.

7. An exposure control device as defined in claim 6 wherein said photosensitive sensor is mounted in said camera in substantially the same plane as said film and said flashlamp illumination means is also mounted in said camera.

8. An exposure control device as defined in claim 5 wherein main exposure is automatically regulated in accordance with the amount of bump exposure desired in order that the cumulative illumination produced by said main lamp illumination means during main exposure and bump exposure will not exceed a predetermined value.

9. An exposure control device as defined in claim 5 wherein said first signal is compared with a signal produced in response to said predetermined main exposure time at zero highlight density and the predetermined highlight density of said copy.

10. An exposure control device as defined in claim 5 wherein said second signal is compared with a signal produced in response to said predetermined basic flash exposure time, screen range, and the predetermined highlight and shadow density of said copy.

11. An exposure control device as defined in claim 5 wherein said first signal is compared with a signal produced in response to said predetermined main exposure time at zero highlight density and the highlight density of said copy and said second signal is compared with a signal produced in response to said predetermined basic flash exposure time, screen range, and the predetermined highlight and shadow density of said copy.

12. An exposure control device for use in controlling main lamp and flashlamp exposures in halftone photography wherein a copy is being photographed by a camera having a halftone screen and film mounted therein, said device comprising: main lamp illumination means; flashlamp illumination means; main lamp sensor and integrator means responsive to illumination generated by said main lamp illumination means and adapted to produce a first signal in response to the cumulative illumination produced by said main lamp illumination means; flashlamp sensor and integrator means responsive to illumination generated by said flashlamp illumination means and adapted to produce a second signal in response to the cumulative illumination produced by said flashlamp illumination means; comparator means for comparing said first and second signals with signals produced in response to predetermined characteristics and conditions of said copy, halftone screen and film; and switch means operatively connected to said comparator means for controlling the operation of said main lamp and flashlamp illumination means in response to a predetermined condition of said first and second signals, said flashlamp sensor and integrator means including a photosensitive sensor which is positioned to record the total illumination generated by said flashlamp illumination means and the total flare produced in said camera.

13. An exposure control device as defined in claim 12 wherein said photosensitive sensor is mounted in said camera in substantially the same plane as said film and said flashlamp illumination means is also mounted in said camera.

14. An exposure control device for use in controlling main lamp and flashlamp exposures in halftone photography wherein a copy is being photographed by a camera having a halftone screen and film mounted therein, said device comprising: main lamp illumination means; flashlamp illumination means; main lamp sensor and integrator means responsive to illumination generated by said main lamp illumination means and adapted to produce a first signal in response to the cumulative illumination generated by said flashlamp illumination means and adapted to produce a second signal in response to the cumulative illumination produced by said flashlamp illumination means; comparator means for comparing said first and second signals with signals produced in response to predetermined characteristics and conditions of said copy, halftone screen and film; switch means operatively connected to said comparator means for controlling the operation of said main lamp and flashlamp illumination means in response to a predetermined condition of said first and second signals, and means for automatically regulating main lamp exposure in accordance with the amount of bump exposure desired in order that the cumulative illumination produced by said main lamp illumination means during main exposure and bump exposure will not exceed a predetermined value.

* * * * *

UNITED STATES PATENT OFFICE
CERTIFICATE OF CORRECTION

Patent No. 3,619,055    Dated November 9, 1971

Inventor(s) Harold Brent Archer

It is certified that error appears in the above-identified patent and that said Letters Patent are hereby corrected as shown below:

Column 2, delete lines 67-73
Column 3, line 45, "($1D_H$)" should read -- ($D_H$)--

Column 3, line 45, before "of" (first occurrence) delete --H)--

Column 7, line 47, the numeral "192" should read --102--

Signed and sealed this 1st day of May 1973.

(SEAL)
Attest:

EDWARD M. FLETCHER, JR.          ROBERT GOTTSCHALK
Attesting Officer                Commissioner of Patents